United States Patent [19]

Nakagawa

[11] Patent Number: 4,938,325
[45] Date of Patent: Jul. 3, 1990

[54] VIBRATION DAMPING APPARATUS FOR PULSE MOTOR

[75] Inventor: Hiroshi Nakagawa, Mie, Japan

[73] Assignee: Shinko Electric Co., Ltd., Tokyo, Japan

[21] Appl. No.: 247,067

[22] Filed: Sep. 20, 1988

Related U.S. Application Data

[62] Division of Ser. No. 880, Jan. 6, 1987, abandoned.

[30] Foreign Application Priority Data

Jan. 9, 1986 [JP] Japan ................................. 61-002833
Mar. 14, 1986 [JP] Japan ................................. 61-037306

[51] Int. Cl.$^5$ ................................. H02K 7/02
[52] U.S. Cl. ................................. 188/378; 267/137; 310/49 R; 310/51
[58] Field of Search ............ 188/378, 379, 268, 380, 188/267, 266; 267/136, 137; 318/696, 685, 38; 310/51, 74, 49 R, 103, 105; 181/202; 403/291, 220

[56] References Cited

U.S. PATENT DOCUMENTS

| | | | |
|---|---|---|---|
| 3,790,831 | 2/1974 | Morreale | 310/49 R |
| 4,049,985 | 9/1977 | Sudler | 188/267 |
| 4,200,003 | 4/1980 | Miller | 188/378 |
| 4,406,642 | 9/1983 | McNall | 188/267 |
| 4,724,923 | 2/1988 | Waterman | 188/267 |

FOREIGN PATENT DOCUMENTS

| | | | |
|---|---|---|---|
| 0137737 | 8/1982 | Japan | 188/267 |
| 0137738 | 8/1982 | Japan | 188/267 |

*Primary Examiner*—Andres Kashnikow
*Assistant Examiner*—Mark T. Le
*Attorney, Agent, or Firm*—Wenderoth, Lind & Ponack

[57] ABSTRACT

A vibration damping apparatus for a pulse motor having a movable member. The apparatus has a back plate fitted to the movable member of the pulse motor for serving as a base part of the apparatus, a first permanent magnet mounted on a flat plate portion of the back plate for transmitting movement of the motor to later stages of the vibration damping apparatus, and an inertia member disposed in opposed relation to the first permanent magnet and movable relative to the first permanent magnet in a plane parallel to the flat plate portion and having a second permanent magnet thereon magnetically coupled with the first permanent magnet, the inertia member having a natural frequency substantially equal to the natural frequency of the pulse motor without the inertia member.

8 Claims, 6 Drawing Sheets

FIG.5(b)    FIG.5(a)    FIG.5(c)
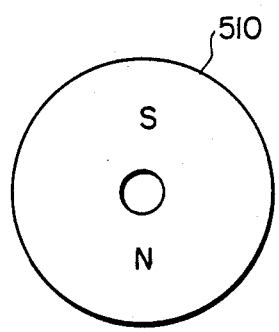
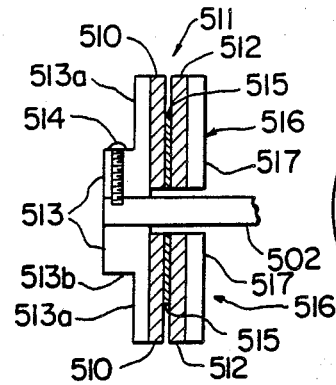
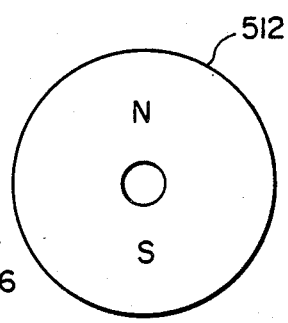
FIG.6
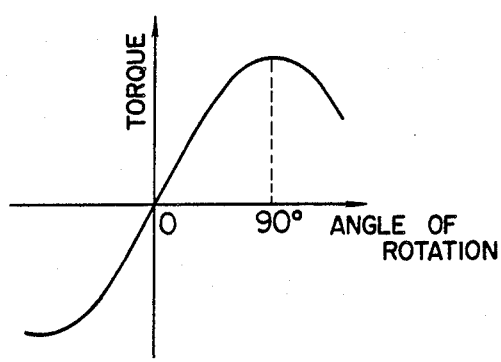
FIG.7
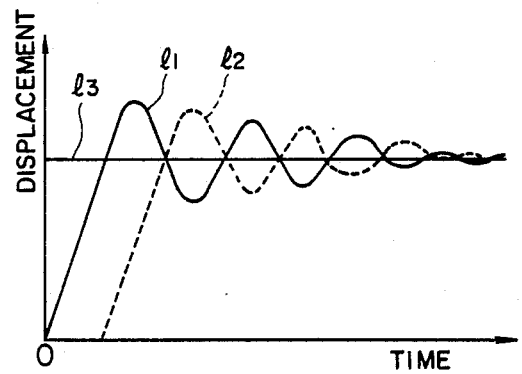

FIG.8(a)   FIG.3(b)   FIG.9
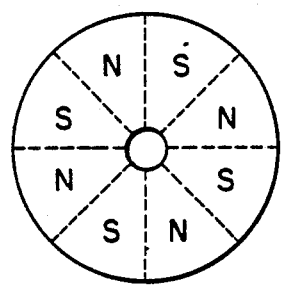
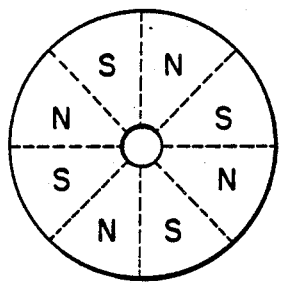
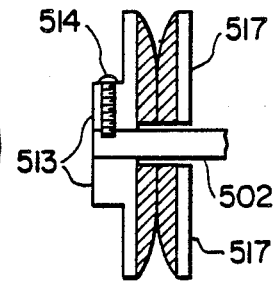
FIG.10
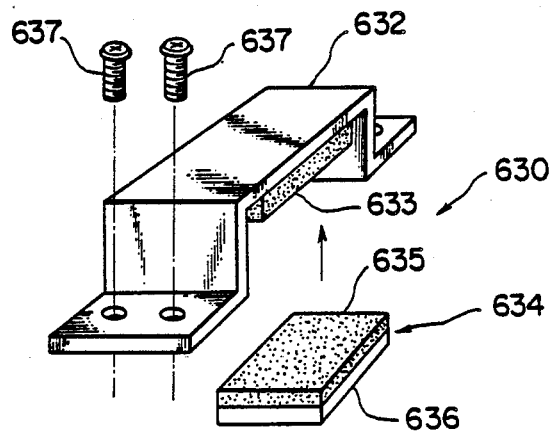
FIG.11
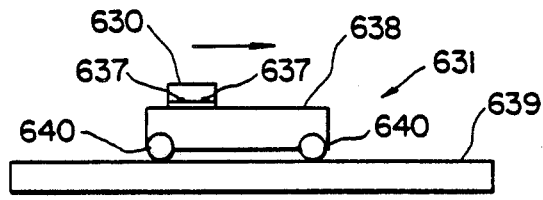

VIBRATION DAMPING APPARATUS FOR PULSE MOTOR

This application is a Rule 1.60 division of application Ser. No. 07/000,880, filed Jan. 6, 1987, now abandoned.

BACKGROUND OF THE INVENTION

1. Field of the Invention

The present invention relates to a vibration damping apparatus for damping vibrations produced in pulse motors such as linear pulse motors sand rotary pulse motors for intermittently driving and feeding a head of a floppy disk regeneration device and the like.

2. Description of the Prior Art

Pulse motors can be positioned by closed loop control and hence are widely employed for various types of driving mechanisms in office automation terminal apparatuses. For example, with the recent progress of office automation, floppy disk regenerative devices have prevailed as memories. The head of such a floppy disk regenerative device is frequently driven by a pulse motor. Moreover, pulse motors are employed for driving print heads of printers and typewriters, etc. These pulse motors, however, suffer from some problems. In particular, vibration produced in such a pulse motor causes severe problems for various applications. In the following, a general arrangement of a pulse motor will first be described, before discussing the problems.

FIGS. 12 and 13 exemplarily show a prior pulse motor of this type.

In these figures, designated at 1 is a mild steel movable member (primary member), and 2 is a stator (secondary member). The movable member 1 has a comb-shaped movable tooth 1a formed on the lower surface thereof. The stator 2 includes a permanent magnet 3, a slit plate 4, electromagnet coils 5, a yoke 6, linear bearings 7, guides 8 and 9, and a back plate 18. The slit plate 4 is disposed on the lower side of the movable member 1 in a confronting relation therewith. The yoke 6 around which the electromagnet coils 5 are fixed, and the flat H-shaped permanent magnet 3 are fixedly mounted in or on the lower side of the slit plate 4. The yoke 6 has in the center thereof, a cross-shaped groove to thereby form four magnetic poles 6a, 6b, 6c, and 6d. The slit plate 4 has comb-shaped pole teeth 4a, 4b, 4c, and 4d formed at positions just above the magnetic poles 6a, 6b, 6c, and 6d. These pole teeth 4a, 4b, 4c, and 4d are positioned so as to be separated from the movable tooth 1a of the movable member 1 by a very minute gap in a confronting relation therewith by holding the linear bearings 7 between the slit plate 4 and the movable member 1. The guides 8 and 9 are mounted on the upper side of the movable member 1. The linear bearings 7 and the movable member 1 are fitted longitudinally movably in a travelling path formed by the slit plate 4 and the guides 8 and 9. The back plate 18 is mounted on the lower side of the permanent magnet 3.

With the arrangement as described above, the movable member 1 is mounted movably longitudinally thereof relatively to the stator 2. In addition, the movable tooth 1a and the pole teeth 4a, 4b, 4c, and 4d are adapted oppose to each other across a minute gap. With a pulse-shaped current supplied to the coils 5, in this situation, the movable member 1 is moved stepwise on the stator 2.

Since the prior linear pulse motor described above is driven stepwise by the pulse-shaped current as described above, the movable member 1 is forced to vibrate longitudinally thereof for some time around a prescribed position even after it is moved to that position. In particular, a pulse motor does not need a conversion mechanism for converting a rotating motion to a linear motion for example between it and an object to be driven since it undergoes the linear motion by itself, but this unfortunately causes the time needed to settle the movable member 1 to be prolonged since the vibration of the movable member 1 is not cancelled out by making use of mechanical loss of the conversion mechanism. Therefore, when the pulse motor is employed for driving the head of a floppy disk, the time to access data is delayed or the data so accessed presents insufficient reliability. Moreover, when the pulse motor is employed for driving print heads of printers and typewriters, etc., the printing speed thereof can not be increased, or an increase, if possible, of the printing speed results in deterioration of printing quality. In addition, another problem with such a pulse motor will be described. A linear pulse motor is in general rotated followed by vibration since it is rotated stepwise through a prescribed angle (step angle) for each pulse input. In addition, such a motor can be regarded as a kind of spring from viewpoint of the mechanism of producing the torque of the motor, and so the vibration of the motor is accelerated and amplified by stopped pulsating torque to result in further larger vibration. Accordingly, such vibration causes severe problem depending on the applications of the pulse motor and hence it is urgently desired to prevent such vibration from being produced. There are known conventional methods to prevent such vibration such as an electronic method wherein the timing of a motor driving pulse is controlled and a mechanical method wherein a frictional load is mounted on a motor shaft or both the frictional load and an inertia load are mounted thereon.

FIG. 14 is a cross sectional view illustrating a prior arrangement of a vibration damping apparatus 57 using the frictional load and the inertia load in the mechanical method described above. In the figure, designated at 51 is a pulse motor, and 52 is a shaft thereof. A mild steel disk 53 having a mounting part 53a is attached to the shaft 52 by means of a screw 54, which disk includes an annular frictional plate 55 bonded thereto. An annular inertia member 56 composed of a permanent magnet 56a and a back plate 56b is disposed on the other surface of the frictional plate 55 in contact therewith. This back plate 56b forms magnetic paths $\theta$, between the permanent magnet 56a and the mild steel disk 53 to serve as a flywheel for averaging variations in the rotating speed of the motor. These mild steel disk 53, frictional plate 55, and inertia member 56 together constitute the vibration damping apparatus 57.

With the pulse motor 51 being driven by such arrangement, the inertia member 56 and the mild steel disk 53 are integrally rotated owing to the magnetic force of the permanent magnet 56a when the acceleration of the motor 51 is low. On the other hand, when higher acceleration is applied to the pulse motor 51 (upon acceleration or interruption), the inertia member 56 is left behind the rotation of the shaft 52 because of the inertia force thereof to produce sliding thereof. Owing to this sliding, excess kinetic energy is converted to thermal energy, whereby the rotation speed of the pulse motor 1 is prevented from becoming uneven and the pulse motor 1 is prevented from vibrating during an interruption in the rotation thereof.

However, it is inherent in the prior vibration damping apparatus described that heat is produced by permitting the inertia member 56 to largely slide for assuring a satisfactory effect of the vibration prevention. In order to dissipate this heat it is necessary to increase the size of the back plate 56b while providing the permanent magnet 56a having the attraction force in a size corresponding to the size of the plate 56b. As a result, the vibration damping apparatus 57 becomes large-sized and the weight thereof is increased, which results in deterioration of the acceleration characteristic of the pulse motor 1.

SUMMARY OF THE INVENTION

In view of the drawbacks of the prior pulse motor, it is a first object of the invention to provide a vibration damping apparatus for a pulse motor such as linear pulse motors and rotary pulse motors which is capable of reducing the time to settle vibration produced in the pulse motor upon driving the pulse motor. Furthermore, it is a second object of the invention to provide a vibration damping apparatus which is miniaturized and light in weight, and which is capable of assuring the effect of vibration prevention.

To achieve the above first object of the invention, a vibration damping apparatus is provided for a pulse motor composed of a fixed member (primary member) having magnetic flux generating means and of a movable member (secondary member) moving on a travelling path formed on the fixed member, the vibration damping apparatus including a damper mounted on at least one of the fixed member and the movable member, the damper comprising at least in part a viscoelastic member and having a natural frequency substantially equal to that of the pulse motor except for the damper. To achieve the second object, a vibration damping apparatus is provided for a pulse motor composed of a fixed member (primary member) and of a movable member (secondary member) moving on a travelling path formed on the fixed member, the vibration damping apparatus including a first permanent magnet fixedly mounted on the movable member, and a second permanent magnet disposed in a confronting relation with the first permanent magnet and having magnetic poles arranged in opposition to those of the first permanent magnet, the second permanent magnet having a natural frequency substantially equal to that of the movable member of the pulse motor excepting the second permanent magnet.

According to the first described clamping apparatus, even if the movable member vibrates around a prescribed position when the movable member is driven to the prescribed position, for example, the vibration can be cancelled out and reduced by the vibration of the damper.

In addition, according to the second invention, the vibration of the movable member of the pulse motor can be cancelled out by the second permanent magnet, whereby the vibration of the movable member can rapidly be damped.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5(a) is a sectional view illustrating a second embodiment of the vibration damping apparatus of the present invention;

FIGS. 5(b) and 5(c) are respectively front views illustrating arrangements of permanent magnets 510 and 512 shown in FIG. 5(a);

FIGS. 6 and 7 are graphs illustrating operation of the vibration damping apparatus according to the second embodiment;

FIGS. 8(a) and 8(b) are respectively front views illustrating the arrangements of the permanent magnets 610 and 612 shown in FIGS. 5(a) and 5(b) when they are magnetized with multiple poles;

FIG. 9 is a sectional view exemplarily showing another arrangement of the permanent magnets 510 and 512 of FIG. 5(a);

FIGS. 10 and 11 are respectively a perspective view and a side view illustrating a second embodiment of the vibration damping apparatus according to the invention;

DESCRIPTION OF THE PREFERRED EMBODIMENTS

In the following, respective embodiments of the present invention will be described with reference to the accompanying drawings.

Figure 1:
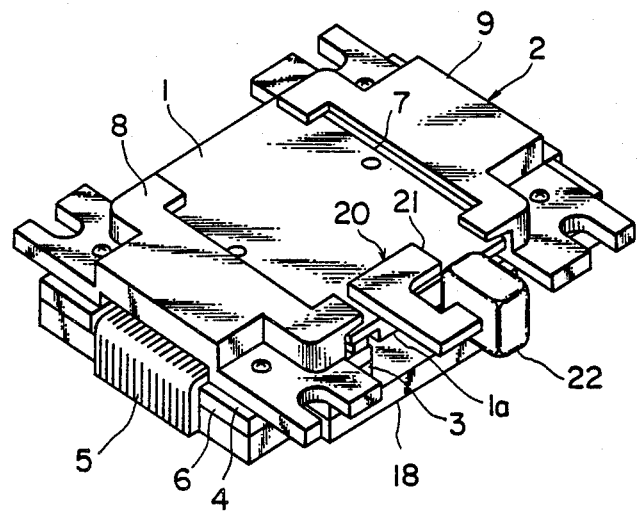
FIG. 1 is a perspective view of a pulse motor illustrating an embodiment of a vibration damping apparatus mounted on a pulse motor according to the present invention.

FIG. 1 is a view illustrating a pulse motor having a vibration damping apparatus mounted thereon being a first embodiment of the invention. The arrangement of the pulse motor described in the present embodiment is substantially the same as that of the prior art pulse motor described above. Accordingly, the same symbols shall be applied to the same constituent elements as those of the prior art example, and the description thereof will be omitted.

The pulse motor in the present embodiment differs from the prior art one described above in the arrangement of the movable member 1. The movable member 1 in the present invention includes a damper 20 mounted on a longitudinal one end thereof. The damper 20 consists of a C-shaped flat plate viscoelastic member 21 and a resilient balancer 22. The viscoelastic member 21 has one end thereof mounted on the movable member 1, on the other end of which the balancer 22 is mounted. The damper 20 has its mass and various viscoelastic quantities adjusted such that the resonance frequency thereof is substantially equal to that of the pulse motor without the damper 20.

The present pulse motor is driven in the same manner as the prior art one. The movable member 1 of the present pulse motor has a resonance frequency of the pulse motor without the damper and is subjected to force to cause it to vibrate around the prescribed position. Simultaneously, however, the damper 20 is not subjected to any force until the movable member 1 is moved, and hence the damper which has a frequency substantially equal to the resonance frequency of the pulse motor without the damper is adapted to provide force in opposite phase to the above force applied to the movable member 1. Thereby, the damper 20 can cancel out the vibration of the movable member 1, which vibration is caused after the movable member 1 is moved to the prescribed position described above, for reducing the time to settle the vibration of the movable member 1.

Figure 2:
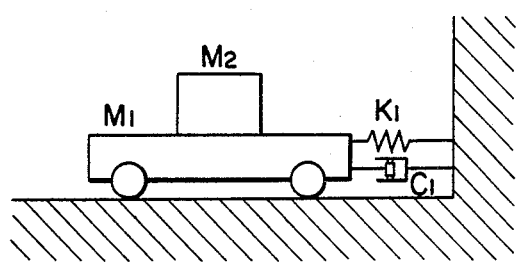
FIG. 2 is a view illustrating a vibration system of the pulse motor without a damper.
Figure 4:
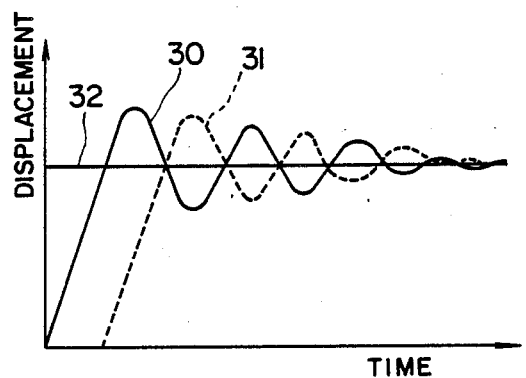
FIG. 4 is a graph illustrating a relationship between the displacements of the pulse motor without the damper and the single damper itself, and time.
Figure 12:
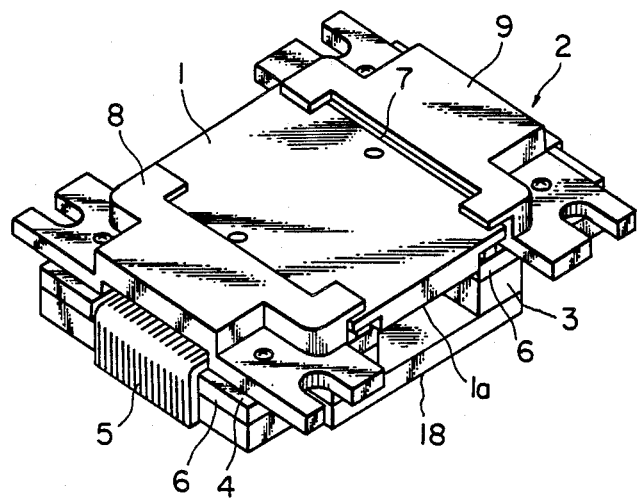
FIG. 12 is a perspective view illustrating a prior pulse motor.
Figure 14:
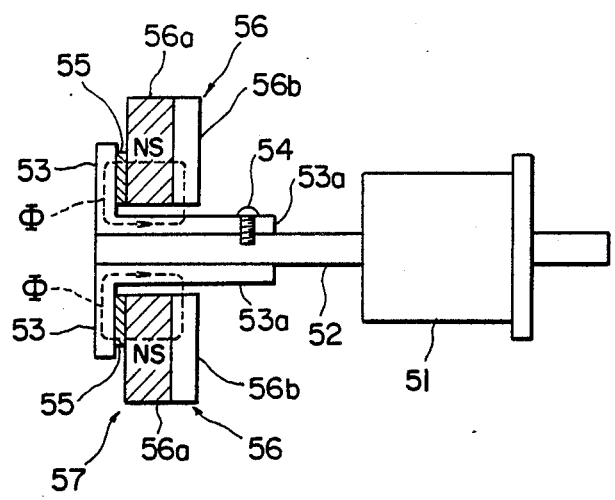
FIG. 14 is a sectional view illustrating a prior vibration damping apparatus.
Figure 13:
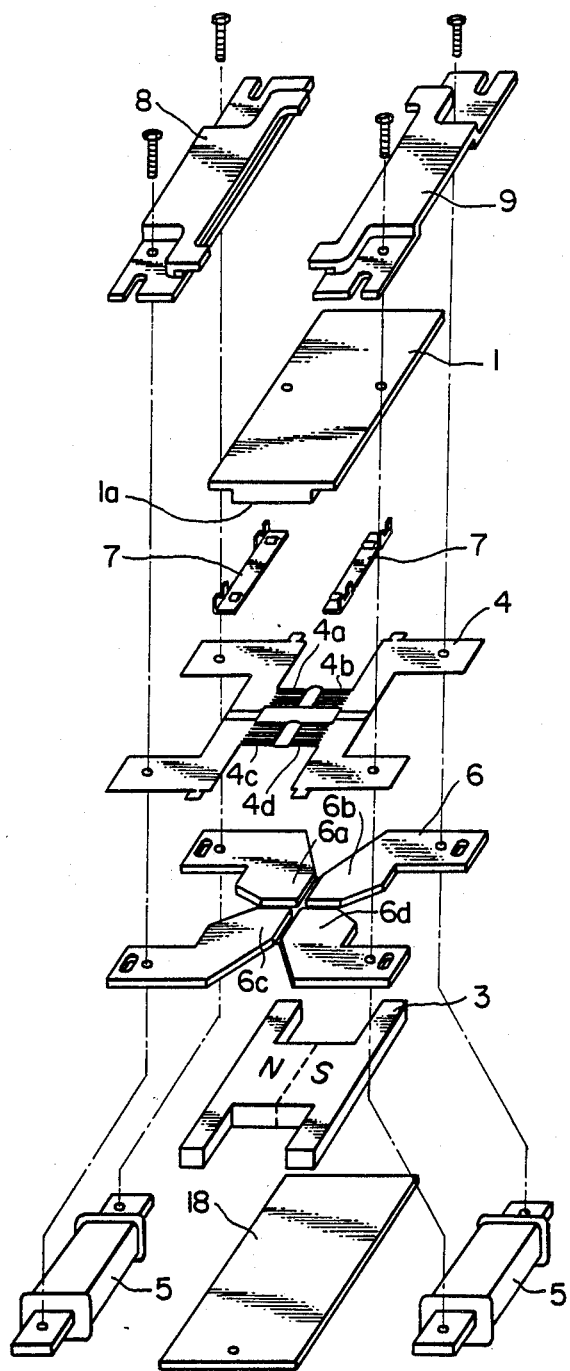
FIG. 13 is an exploded view of the motor of FIG. 12.

Operation of the damper 20 will be described in detail with reference to FIGS. 2 and 4.

First, vibration of the pulse motor without the damper 20 will be analyzed. FIG. 2 is a view illustrating a vibration system of the pulse motor without the damper 20. In the same figure, M1 denotes the mass of the movable member 1, M2 is the mass of a load attached to the movable member 1, K1 is a spring constant corresponding to the retaining force of the pulse motor, and C1 is a constant indicative of resistance such as friction to reduce the vibration of the movable member 1. The resonance frequency f1 of the vibration system is expressed by the following equation:

$$f1 = \tfrac{1}{2}\pi \sqrt{K1/(M1 + M2)}$$

Namely, the movable member 1 is forced to vibrate at the frequency f1 by vibrating it externally and by driving the pulse motor. This vibration is sustained for a period of time specified by the constant C1 of the resistance.

Figure 3:
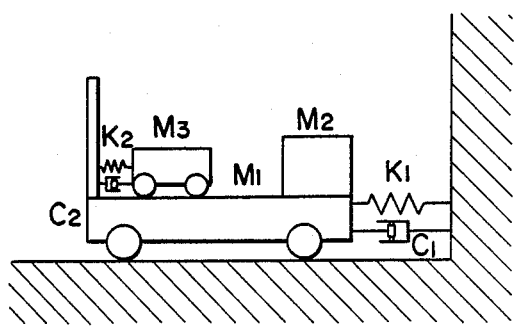
FIG. 3 is a view illustrating the vibration system of the pulse motor including the damper mounted thereon.

In order to reduce the vibration of the movable member 1, a method is considered of providing on the movable member 1, a second vibration system having a resonance frequency approximately f1 for thereby cancelling out the vibration of the movable member 1. FIG. 3 is a view illustrating the vibration system of the pulse motor wherein the damper 20 which is the second vibration system is mounted on the movable member 1. In the same figure, M3 is the mass of the damper 20, k2 is the spring constant of the damper 20, and C2 is a constant indicative of viscosity of the damper 20. The resonance frequency of this damper 20 is expressed by the following equation:

$$f2 = \tfrac{1}{2}\pi \sqrt{K2/M3}$$

These quantities M3 and K2 of the damper are previously adjusted such that the resonance frequency f2 is substantially equal to the resonance frequency f1 of the pulse motor without the above damper.

The damper 20 is not subjected to the any force until the movable member 1 is moved. For this, the movement of damper 20 is slightly delayed with respect to the movement of the movable member 1. Then the damper 20 does not stop owing to its inertia although the movable member 1 reaches a prescribed position and stops, and tries it to go forward in the moving direction of the movable member. Therefore, the damper 20 vibrates at its resonance frequency approximately equal to that of the pulse motor but in the opposite phase where the direction of the vibration there is reversed. This vibration is sustained for a period of time specified by the constant C2 of the resistance. FIG. 4 shows the situation described above. In the figure, the numeral 30 designates a curve showing the displacement of the movable member 1 of the pulse motor without the damper 20, the numeral 31 designates a curve showing the displacement of the damper 20, and the numeral 32 designates a straight line on the graph, a prescribed position of the movable member 1 to be stopped. The movable member 1 without the damper 20 and the damper 20 vibrate around the prescribed position 32 at the frequency substantially equal to each other in the opposite phase. Thereby, the vibration of the movable member 1 is cancelled out in the vicinity of the prescribed position 32 owing to the vibration of the damper 20.

Thus, it is possible with the arrangement described above to provide the vibration damping mechanism for the pulse motor capable of reducing the time to settle the vibration.

The damper 20 is mounted on the fixed member 2 since when the pulse motor is employed for driving print heads of a printer and a typewriter, etc., the movable member 1 is fixed on each of the bodies thereof. In addition, the damper 20 can not only be mounted on the movable member 1 along the moving direction thereof, but can be mounted thereon in a direction perpendicular to the above moving direction. Moreover, the damper 20 can not only be mounted on the movable member 1 or the fixed member 2, but can be mounted for example on a load attached the movable member 1 or the fixed member 2.

Further, although in the above description the fixed member was described as the primary member and the movable member as the secondary member, these terms are employed relatively, i.e., the fixed member and the movable member may be either the primary or the secondary members.

The further embodiments of the present invention will be described with reference to the accompanying drawings.

FIG. 5(a) is a cross sectional view illustrating the arrangement of another embodiment of the invention. As shown in the figure, a substantially disk-shaped back plate 513 having a mounting part 513b is fitted to the shaft 502 of a pulse motor, and fixedly mounted thereon by means of a screw 514. An annular permanent magnet 510 is fixedly mounted on the vertical flat plate part 513a of the back plate 513, which magnet has two poles magnetized as shown in FIG. 5(b). A spacer 515 made of a slidable material such as Teflon is attached to the other surface of the permanent magnet 510, and an inertia member 516 having the same shape as that of the permanent magnet 510 is disposed in contact with the other surface of the spacer 515. This inertia member 516 consists of an annular permanent magnet having two poles magnetized as shown in FIG. 5(c) and a back plate 517 having the same shape as that of the permanent magnet 512 and bonded to the permanent magnet 512.

The operation of the first embodiment will be described with reference to FIGS. 6 and 7. FIG. 6 shows the relationship between angles Θ of relative rotation of the respective magnets 510 and 512 from a normal opposing position of the permanent magnets 10, 12 (a position where the pole S of the permanent magnet 510 is opposed to the pole N of the permanent magnet 512) and torque T exerted between the above respective magnets 10, 12. In the same figure, the torque T is O when the angle of rotation $\theta$ is 0, i.e., the permanent magnets 510 and 512 are located at the normal opposing position, and the torque T becomes maximum when the above angle $\theta$ is 90° C.

Thus, when the acceleration of the pulse motor is low, the torque T is 0 since both the permanent magnets 510 and 512 are opposed to each other at the normal opposing position (the angle of rotation $\theta=0$), and thus both are integrally rotated. On the other hand, when the acceleration becomes higher to some degree, the inertia member 516 is left behind from the rotation of the shaft 502 owing to the inertia force thereof to cause a displacement between the permanent magnets 510 and 512, whereby the torque T in response to the angle of rotation $\theta$ is produced between the magnets 510 and 512 as shown in FIG. 6. This torque serves as centripetal force to return the magnet 512 to the normal opposing position. The operation of the magnet 512 is as follows: The inertia member 516 vibrates at a natural frequency $$f1 = \tfrac{1}{2}\pi \sqrt{K/J}$$

specified by the spring constant K determined by $T/\theta$ and the inertia J of the inertia member 516.

On the other hand, the rotor of the pulse motor without the inertia member 516 also has a natural frequency established with quite the same relation as the above equation, i.e., a natural frequency f2 determined by the torque constant of the same motor and the inertia of the rotor, and vibrates at the frequency f2. Therefore, provided the natural frequency f2 of the rotor is made equal to that f1 of the inertia member 516, the vibration of the pulse motor can rapidly be damped. FIG. 7 shows this situation. In this figure, the symbol l1 designates a curve showing the rotor displacement of the pulse motor without the inertia member 516, l2 designates a curve showing the displacement of the inertia member 516, and l3 designates a straight line showing the stoppage position of the rotor. As described above, the rotor of the pulse motor without the inertia member 516 and the inetia member 516 vibrate around the stoppage position 13 at the respective natural frequencies f2 and f1 substantially equal to each other but in the opposite phase. Thereby, the vibration of the rotor of the same motor is cancelled out owing to the vibration of the inertia member 16 to cause the rapid stoppage of the rotor.

Thus, according to this embodiment of the invention described above, a remarkable vibration damping effect can be assured by means of the vibration damping apparatus 511 which is small-sized and made light weight.

In addition, in the above embodiment of the invention each of the permanent magnet 510 on the driving side and the permanent magnet 512 on the inertia member side was adapted to have two magnetized poles, but they can have multiple poles magnetized as shown in FIGS. 8(a) and (b). By this arrangement, the spring constant of the inertia member can be improved. Moreover, for the cross sectional shapes of the permanent magnets 510 and 512, outer opposing circumferential parts of the respective magnets 510 and 512 can be circular arc-shaped as shown in FIG. 9. By this shape, the movement of the inertia member can further be smoothed. Furthermore, the spacer 515 is not necessarily needed, but lack of a spacer of this type causes too strong a magnetic attraction between the permanent magnets 510 and 512. Thus, the spacer is preferably provided.

FIGS. 10 and 11 are respectively a perspective view and a diagrammatic side elevation view illustrating the arrangement of a vibration damping apparatus 630 according to a further embodiment of the invention. In these figures, the numeral 632 designates a mounting plate, to the lower surface of which a permanent magnet 633 is bonded. In addition, the numeral 634 is a damping member having the same shape as that of the permanent magnet 633, which consists of the permanent magnet 635 and a back plate 636 bonded to the magnet 635. With the damping member 634 and a slider 638 without the damping member 634 being previously set to be equal in their natural frequencies, the damping member 634 is joined with the permanent magnet 633 with the aid of the magnetic attraction. Accordingly, provided acceleration of the slider 638 is low, the permanent magnets 633 and 634 are integrally coupled. In such a manner, the mounting plate 632, permanent magnet 633, and damping member 634 described above constitute the damping apparatus 630.

With such an arrangement, the vibration of the slider 638 is cancelled out owing to the vibration of the damping member 634. Namely, the same effect as that of the first embodiment can be achieved also in this second embodiment.

According to the first embodiment of the invention, as described above, in a pulse motor composed of the fixed member including the magnetic flux generating means and the movable member moving on the travelling path formed by the above fixed member, a damper constructed at least in part with a viscoelastic member is mounted on at least one of the fixed member and the movable member, the natural frequency of which damper is in turn substantially equal to the natural frequency of the movable member. For example, when the movable member is driven to a prescribed position, even if the movable member vibrates around that prescribed position, the vibration can be cancelled out by making use of the vibration of the damper. Thus, it is made possible upon driving a linear pulse motor to achieve a vibration damping apparatus of the linear pulse motor capable of reducing the time to settle the vibration.

In addition, according to the fourth embodiments of the invention, as described above, a damping apparatus has a first permanent fixedly mounted on the movable member of a linear pulse motor and the second permanent magnet provided in opposition to the first permanent magnet. The natural frequency of the second permanent magnet is made equal to that of the movable member of the pulse motor without the second permanent magnet. Thus, the following effects can be assured:

(1) The apparatus can be miniaturized and made light in weight, while providing a remarkable vibration damping effect.

(2) With the apparatus miniaturized and made light in weight, bad influences on the characteristics of the pulse motor can be reduced to the minimum.

(3) Construction of a spring only with the permanent magnet can simplify the structure of the damping apparatus.

(4) Reduction of time to settle the vibration of the pulse motor upon effecting single step feed thereof can improve printing quality when the apparatus is employed for printers, etc.

(5) Reduced unevenness of motor R.P.M. upon driving a pulse motor at a prescribed frequency can assure higher reliability reading when the apparatus is employed for scanners, etc.

(6) As a result of the reduction of the vibration of a pulse motor, any vibration to be transmitted to the outside can be lowered to achieve low noise operation.

Although certain preferred embodiments have been shown and described, it should be understood that many changes and modifications may be made therein without departing from the scope of the appended claims.

What is claimed is:

1. A vibration damping apparatus for a pulse motor having a movable member, comprising:
    a back plate secured to said movable member of said pulse motor for serving as a base part of said apparatus;
    a first permanent magnet mounted on a flat plate portion of said back plate for transmitting movement of the motor to later stages of said vibration damping apparatus; and
    an inertia member disposed in opposed relation to said first permanent magnet and movable relative to said first permanent magnet in a plane parallel to said flat plate portion and having a second permanent magnet thereon magnetically couplable with said first permanent magnet, said inertia member having a natural frequency substantially equal to the natural frequency of said pulse motor without said inertia member, whereby when said back plate is being moved, said inertia member will tend to lag behind said back plate, and upon cessation of movement of said back plate, said inertia member will be moved to bring the poles of said second magnet into alignment with the opposite poles of said first magnet.

2. A vibration damping apparatus as claimed in claim 1 in which said pulse motor is a rotary motor having a shaft and said back plate is mounted on said shaft.

3. A vibration damping apparatus as claimed in claim 1 in which said inertia member includes a second back plate to which said second permanent magnet is secured.

4. A vibration damping apparatus as claimed in claim 1 in which said first permanent magnet and said second permanent magnet each have two poles of opposite polarity, and the opposite polarity poles on the respective magnets are opposed to each other.

5. A vibration damping apparatus as claimed in claim 1 in which said first permanent magnet and said second permanent magnet each have a plurality of poles of different polarity and the opposite polarity poles on the respective magnets are opposed to each other.

6. A vibration damping apparatus as claimed in claim 1 further comprising a spacer between said permanent magnets for reducing the magnetic coupling therebetween.

7. A vibration damping apparatus as claimed in claim 1 wherein the outer circumferential edges of said permanent magnets on the opposing faces thereof are circular arc-shaped in cross sectional profile.

8. A vibration damping apparatus as claimed in claim 1 in which said inertia member has a frequency of vibration according to the expression:

$$f_1 = \tfrac{1}{2}\pi \sqrt{K/J}$$

where K is an equivalent spring constant of the inertia member and J is the inertia of said inertia member for cancelling out the vibration of the pulse motor which occurs without said inertia member.

* * * * *